(12) United States Patent
Subburaj et al.

(10) Patent No.: US 12,021,552 B2
(45) Date of Patent: Jun. 25, 2024

(54) INTERMEDIATE FREQUENCY AMPLIFIER WITH A CONFIGURABLE HIGH-PASS FILTER

(71) Applicant: TEXAS INSTRUMENTS INCORPORATED, Dallas, TX (US)

(72) Inventors: Karthik Subburaj, Bengaluru (IN); Pranav Sinha, Bengaluru (IN); Mayank Kumar Singh, Dallas, TX (US); Rittu Sachdev, Bengaluru (IN); Karan Singh Bhatia, Plano, TX (US); Shailesh Joshi, Bengaluru (IN); Indu Prathapan, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/566,047

(22) Filed: Dec. 30, 2021

(65) Prior Publication Data

US 2023/0216528 A1 Jul. 6, 2023

(51) Int. Cl.
*H04B 1/00* (2006.01)
*H04B 1/04* (2006.01)
(Continued)

(52) U.S. Cl.
CPC ............. *H04B 1/0075* (2013.01); *H04B 1/04* (2013.01); *H04B 1/1036* (2013.01); *H04B 1/69* (2013.01);
(Continued)

(58) Field of Classification Search
CPC ...... H04B 1/0075; H04B 1/04; H04B 1/1036; H04B 1/69; H04B 2001/0408;
(Continued)

(56) References Cited

U.S. PATENT DOCUMENTS 3,576,564 A * 4/1971 Galvin .................... G01S 13/53
342/160
3,936,824 A * 2/1976 Aker ....................... G01S 13/92
342/115
(Continued)

FOREIGN PATENT DOCUMENTS

WO WO-2019193898 A1 * 10/2019 ............. H03F 3/195

OTHER PUBLICATIONS

English Translation of WO-2019193898-A1, Inventor: Murakami T, Oct. 2019 (Year: 2019).*

*Primary Examiner* — Jinsong Hu
*Assistant Examiner* — Rui M Hu
(74) *Attorney, Agent, or Firm* — Michael T. Gabrik; Frank D. Cimino

(57) ABSTRACT

A device comprises a digital ramp generator, an oscillator, a power amplifier, a low-noise amplifier (LNA), a mixer, and an intermediate frequency amplifier (IFA). The oscillator generates a chirp signal based on an output from the digital ramp generator. The power amplifier receives the chirp signal and outputs an amplified chirp signal to a transmitter antenna. The LNA receives a reflected chirp signal from a receiver antenna. The mixer receives output of the LNA and combines it with the chirp signal from the oscillator. The IFA receives the mixer output signal and includes a configurable high-pass filter, which has a first cutoff frequency during a first portion of the chirp signal and a second cutoff frequency during a second portion of the chirp signal. In some implementations, the first cutoff frequency is chosen based on a frequency of a blocker signal introduced by couplings between the transmitter and receiver antennas.

19 Claims, 6 Drawing Sheets

(51) Int. Cl.
*H04B 1/10* (2006.01)
*H04B 1/69* (2011.01)

(52) U.S. Cl.
CPC ............ *H04B 2001/0408* (2013.01); *H04B 2001/1045* (2013.01); *H04B 2001/1063* (2013.01); *H04B 2001/6912* (2013.01)

(58) Field of Classification Search
CPC .... H04B 2001/1045; H04B 2001/1063; H04B 2001/6912
See application file for complete search history.

(56) References Cited

U.S. PATENT DOCUMENTS

| | | | | |
|---|---|---|---|---|
| 5,677,695 | A * | 10/1997 | Suzuki | G01S 7/4004 342/112 |
| 6,940,893 | B1 * | 9/2005 | Pinkney | H04B 1/69 370/441 |
| 2003/0016157 | A1 * | 1/2003 | Fullerton | H01Q 21/061 342/21 |
| 2006/0022866 | A1 * | 2/2006 | Walton | H01Q 21/08 342/126 |
| 2008/0094274 | A1 * | 4/2008 | Nakanishi | G01S 7/023 342/91 |
| 2011/0122017 | A1 * | 5/2011 | Vacanti | G01S 7/038 342/175 |
| 2011/0279306 | A1 * | 11/2011 | Mouknatjou | G01S 13/103 342/124 |
| 2013/0342383 | A1 * | 12/2013 | Kojima | G01S 13/28 342/134 |
| 2015/0171793 | A1 * | 6/2015 | Regier | H03F 1/26 330/251 |
| 2015/0338507 | A1 * | 11/2015 | Oh | G01S 13/343 342/159 |
| 2016/0266239 | A1 * | 9/2016 | Pavao-Moreira | G01S 13/34 |
| 2016/0277546 | A1 * | 9/2016 | Unhold | H03L 7/1976 |
| 2017/0222673 | A1 * | 8/2017 | Ghajar | H04B 1/123 |
| 2017/0285140 | A1 * | 10/2017 | Gupta | H03D 1/2245 |
| 2018/0011180 | A1 * | 1/2018 | Warnick | G01S 13/06 |
| 2018/0097522 | A1 * | 4/2018 | Chillara | H03L 7/0991 |
| 2018/0115371 | A1 * | 4/2018 | Trotta | H04B 1/38 |
| 2018/0123537 | A1 * | 5/2018 | Salle | H03L 7/08 |
| 2019/0049556 | A1 * | 2/2019 | Steinbuch | G01S 13/42 |
| 2019/0250246 | A1 * | 8/2019 | Murakami | H03D 7/00 |
| 2019/0250264 | A1 * | 8/2019 | Belfiore | G01S 13/343 |
| 2020/0072941 | A1 * | 3/2020 | Jansen | G01S 13/931 |
| 2020/0174098 | A1 * | 6/2020 | Lang | G01S 7/4056 |
| 2020/0264271 | A1 * | 8/2020 | Liu | G01S 7/34 |
| 2020/0274563 | A1 * | 8/2020 | Bowles | H04B 1/109 |
| 2020/0292659 | A1 * | 9/2020 | Bai | G01S 13/931 |
| 2020/0317207 | A1 * | 10/2020 | Sloushch | G01S 13/88 |
| 2020/0371200 | A1 * | 11/2020 | Kim | G01S 7/354 |
| 2021/0080537 | A1 * | 3/2021 | Melzer | G01S 13/584 |
| 2021/0149018 | A1 * | 5/2021 | Elad | G01S 7/35 |
| 2021/0149019 | A1 * | 5/2021 | Subburaj | G01S 7/40 |
| 2021/0165088 | A1 * | 6/2021 | Suzuki | G01S 13/343 |
| 2021/0255280 | A1 * | 8/2021 | Santra | G01S 13/88 |
| 2021/0364622 | A1 * | 11/2021 | Roger | G01S 7/356 |
| 2021/0396867 | A1 * | 12/2021 | Amihood | G01S 13/582 |
| 2022/0003838 | A1 * | 1/2022 | Itkin | G01S 7/4021 |
| 2022/0011423 | A1 * | 1/2022 | Li | G01S 7/023 |
| 2022/0107388 | A1 * | 4/2022 | Vallee | G01S 7/032 |
| 2022/0196796 | A1 * | 6/2022 | Fiore | G01S 7/4008 |
| 2022/0260702 | A1 * | 8/2022 | Vaishnav | G01S 7/415 |
| 2022/0299601 | A1 * | 9/2022 | Jungmaier | G01S 7/4021 |

* cited by examiner

INTERMEDIATE FREQUENCY AMPLIFIER WITH A CONFIGURABLE HIGH-PASS FILTER

BACKGROUND

In some radar systems, couplings between the transmitter and receiver antennas cause a high-power, low-frequency blocker signal to be generated in the resulting intermediate frequency signal. Intermediate frequency amplifiers can include a high-pass filter to remove the blocker signal. However, the high-pass filter can slow the settling of the intermediate frequency signal after turn-on, wasting additional samples of the analog-to-digital converter. The long settling time prevents fast chirp repetitions for detecting fast-moving targets and wastes radar frequency bandwidth while waiting for the intermediate frequency signal to settle.

SUMMARY

A device comprises a digital ramp generator, an oscillator, a power amplifier, a low-noise amplifier (LNA), a mixer, and an intermediate frequency amplifier (IFA). The oscillator generates a chirp signal based on an output from the digital ramp generator. The power amplifier receives the chirp signal and outputs an amplified chirp signal to a transmitter antenna. The LNA receives a reflected chirp signal from a receiver antenna. The mixer receives the output of the LNA and combines it with the chirp signal from the oscillator. The IFA receives the mixer output signal and includes a configurable high-pass filter, which has a first cutoff frequency during a first portion of the chirp signal and a second cutoff frequency during a second portion of the chirp signal.

In some implementations, the first cutoff frequency is higher than the second cutoff frequency, and is chosen based on a frequency of a blocker signal introduced by couplings between the transmitter and receiver antennas. In some implementations, the first portion of the chirp signal is a length of time during which an output of the IFA settles.

In some implementations, the IFA includes an amplifier, three resistors, a capacitor, a buffer, and first and second high-pass filter stages. The amplifier has a negative input coupled to an input node of the IFA, a positive input coupled to a ground node, and an output coupled to an output node of the IFA. The first resistor and the capacitor are coupled in parallel between the negative input and the output of the amplifier. The first high-pass filter stage has an input coupled to the output node of the IFA and an output.

The buffer has an input coupled to the output of the first high-pass filter stage and a buffer output. The second resistor is coupled between the buffer output and the negative input of the amplifier. The second high-pass filter stage has an input coupled to the output of the first high-pass filter stage and an output. The third resistor is coupled between the output of the second high-pass filter stage and the input node of the IFA.

In some implementations, the amplifier is a first amplifier, the capacitor is a first capacitor, and the first high-pass filter stage includes a resistor stage, a second amplifier, and a second capacitor. The resistor stage has an input coupled to the input of the first high-pass filter stage and an output, and includes a fourth resistor, a fifth resistor, and a switch. The fourth resistor is coupled between the input and the output of the resistor stage. The fifth resistor is coupled to the input of the resistor stage and to the switch, which couples the fifth resistor to the output of the resistor stage based on a control signal.

The second amplifier has a negative input coupled to the output of the resistor stage and a positive input coupled to the ground node. The second capacitor is coupled between the negative input and an output of the second amplifier, which is coupled to the output of the first high-pass filter stage. The control signal causes the switch to close during the first portion of the chirp signal and open during the second portion of the chirp signal.

In some implementations, the second high-pass filter stage includes a resistor stage, a second amplifier, and a second capacitor. The resistor stage has an input coupled to the input of the second high-pass filter stage and an output, and includes a fourth resistor, a fifth resistor, and a switch. The fourth resistor is coupled between the input and the output of the resistor stage. The fifth resistor is coupled to the input of the resistor stage and to the switch, which couples the fifth resistor to the output of the resistor stage based on a control signal.

The second amplifier has a negative input coupled to the output of the resistor stage and a positive input coupled to the ground node. The second capacitor is coupled between the negative input and an output of the second amplifier, which is coupled to the output of the second high-pass filter stage. The control signal causes the switch to close during the first portion of the chirp signal and open during the second portion of the chirp signal.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

The described intermediate frequency amplifier includes a configurable high-pass filter with a first cutoff frequency during a first portion of a radar chirp signal while the output signal of the intermediate frequency amplifier settles, and a second cutoff frequency during a second portion of the radar chirp signal after the output signal settles. The first cutoff frequency is greater than the second cutoff frequency and chosen based on a frequency of a blocker signal introduced by couplings between the transmitter and receiver antennas.

Figure 1:
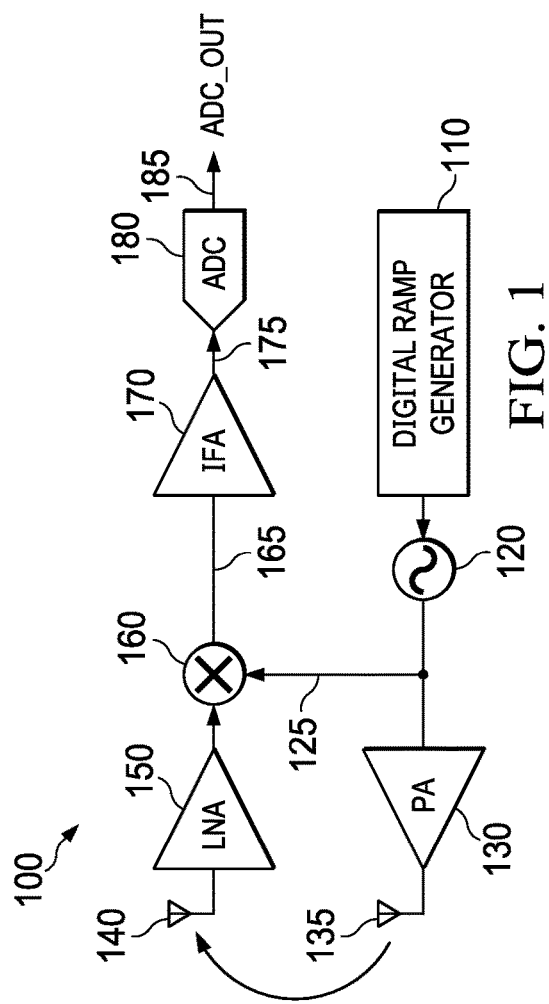
FIG. 1 illustrates a block diagram of an example radar system.

FIG. 1 illustrates a block diagram of an example radar system 100. Radar system 100 may be used in a vehicle, such as for a driver assistance system in an automobile. In this example, radar system 100 includes a digital ramp generator 110, an oscillator 120, a power amplifier (PA) 130, a transmitter (TX) antenna 135, a receiver (RX) antenna 140, a low-noise amplifier (LNA) 150, a mixer 160, an intermediate frequency amplifier (IFA) 170, and an analog-to-digital converter (ADC) 180. The digital ramp generator 110 generates a continuous wave signal and provides it to the oscillator 120, which can be a voltage-controlled oscillator.

The oscillator 120 frequency modulates the continuous signal from the digital ramp generator 110 resulting in a frequency modulated continuous wave (FMCW) signal 125 comprising a series of chirps. The FMCW signal 125 is provided to the PA 130, which amplifies it and provides it to the TX antenna 135, which transmits the radar chirps. The RX antenna 140 receives signals reflected from objects in the path of the transmitted chirp signals and provides them to the LNA 150, which amplifies the received signals. In the example radar system 100, the TX antenna 135 and the RX antenna 140 are stationary. In other examples, the antennas may be configured to transmit and receive across a range of area, such as by mechanical movement.

The amplified signal from the LNA 150 is provided to the mixer 160, as well as the FMCW signal 125, which provides the mixed signal output 165 to the IFA 170. The IFA 170 generates an intermediate frequency signal 175, and provides it to the ADC 180, which digitizes the signal and outputs a digital signal ADC_OUT 185.

FMCW radar, also referred to as continuous-wave frequency-modulated (CWFM) radar, is capable of determining distance, velocity, and angle of arrival. In a FMCW system, the transmitted chirp signal of a known stable-frequency continuous wave varies up and down in frequency over a fixed period of time by a modulating signal. Received reflections are then mixed with the transmitted chirp signal to produce a received beat signal 165, which will give the distance, velocity, and angle of arrival for the target object after signal processing. Frequency differences between the received reflections and the transmitted chirp signal increase with delay between transmission and reception and are therefore proportional to distance.

The phase differences between the received reflections across consecutive chirps allow the velocity of target objects to be computed. The phase differences between the received reflections at a first receiver antenna and the received reflections at a second receiver antenna allow the angle of arrival of target objects to be computed. Thus with an FMCW radar system, the distance between the target object and the radar system, relative velocity of the target object, relative angle of the target object and the like can be calculated.

During normal operation, linear frequency chirps are transmitted, and reflected signals are received. In an example, the receiver and transmitter are arranged as a homodyne system so that the received reflections are down-converted directly into the baseband using a copy of the transmitted signal from oscillator 120. The baseband signals are then filtered and amplified by filters and variable gain amplifiers such as those included in IFA 170. After ADC 180 converts the baseband signals into the digital domain, time domain to frequency domain transforms such as fast Fourier transforms (FFTs) may be applied and other signal processing performed in order to determine the distance, velocity, and angle of arrival between the target object and the radar system 100.

For example, the down-converted and digitized received signal corresponding to each chirp is first transformed using an FFT (called the range FFT). The range FFT produces a series of range bins with the value of each range bin denoting the signal strength of reflected targets at the corresponding range. A Doppler FFT is then performed for each range bin across all the chirps in a frame to estimate the velocities of reflected targets.

Figure 2:
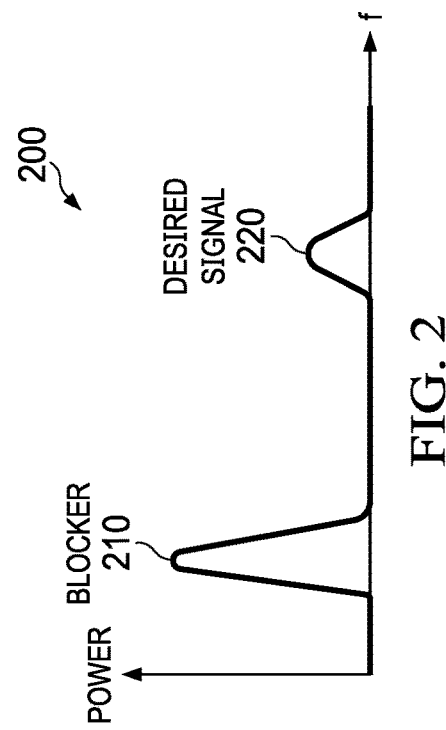
FIG. 2 shows the frequency spectrum of the output signal from the mixer in the example radar system shown in FIG. 1.

TX-RX couplings between the antennas can cause a high-power, low-frequency blocker signal to be generated in the mixer output signal 165. FIG. 2 shows the frequency spectrum 200 of the output signal 165 from the mixer 160, including the blocker signal 210 and the desired signal 220. The IFA 170 includes a high pass filter to remove the blocker signal 210. In some radar systems, the analog radar components are turned off between radar chirps to conserve power, and at turn-on for each radar chirp, the high pass filter leads to slow settling of the ADC_OUT 185, causing several microseconds (µs) of ADC_OUT 185 to be wasted. The long settling time prevents fast chirp repetitions for detecting fast moving targets and wastes radar frequency bandwidth while waiting for the settling.

Figure 3:
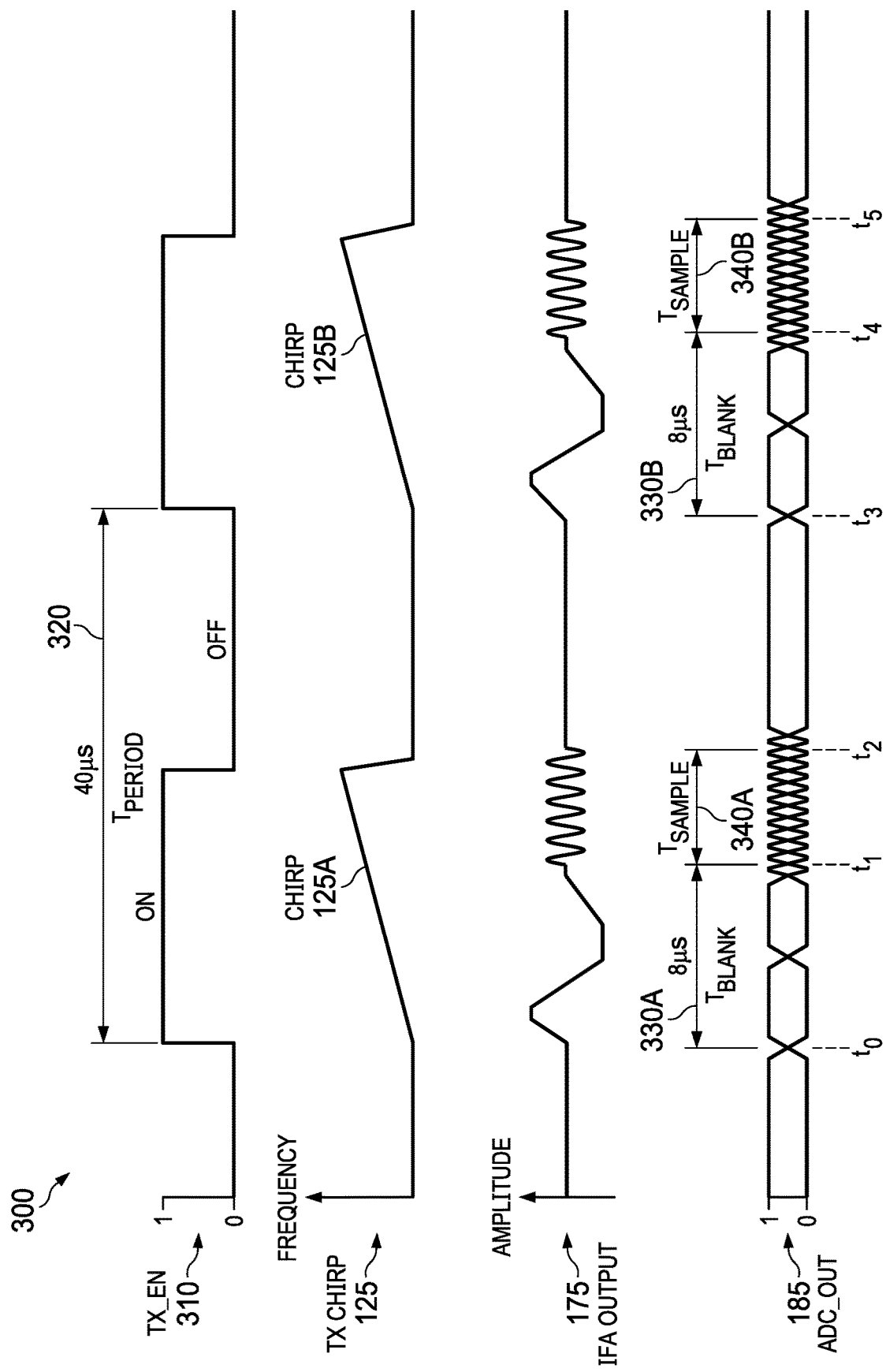
FIG. 3 shows waveforms of signals in the example radar system shown in FIG. 1.

FIG. 3 shows waveforms of signals in the example radar system 100 shown in FIG. 1. The enable signal TX_EN 310 has a period Tperiod 320 of approximately 40 µs in this example and turns on and off the analog components in the radar system 100, including the PA 130, the LNA 150, the mixer 160, and the IFA 170. The TX chirp signal 125 is generated by the oscillator 120 and includes two chirp signals: chirp 125A and chirp 125B. For example, the chirp signals 125A and 125B may begin at 76 GigaHerz (GHz) and increase to 77 GHz in this implementation, corresponding to a 1 GHz bandwidth. The IFA output 175 is the intermediate frequency signal generated by the IFA 170, and the ADC_OUT 185 is the output signal generated by the ADC 180 based on the IFA output 175. At time t0, the TX_EN 310 goes logic high, causing the PA 130, the LNA 150, the mixer 160, and the IFA 170 to turn on.

As the chirp 125A is generated, the high pass filter in the IFA 170 causes the IFA output 175 to be irregular, and the ADC_OUT 185 is wasted until time t1, at which the IFA output 175 settles and the ADC_OUT 185 takes meaningful digital samples of the IFA output 175. The length of time Tblank 330A between t0 and t1 is approximately 8 µs in this example. At time t2, the enable signal TX_EN 310 goes logic low, causing the PA 130, the LNA 150, the mixer 160, and the IFA 170 to turn off. During the length of time Tsample 340A between t1 and t2, the ADC_OUT 185 is able to take meaningful digital samples of the settled IFA output 175.

Figure 4:
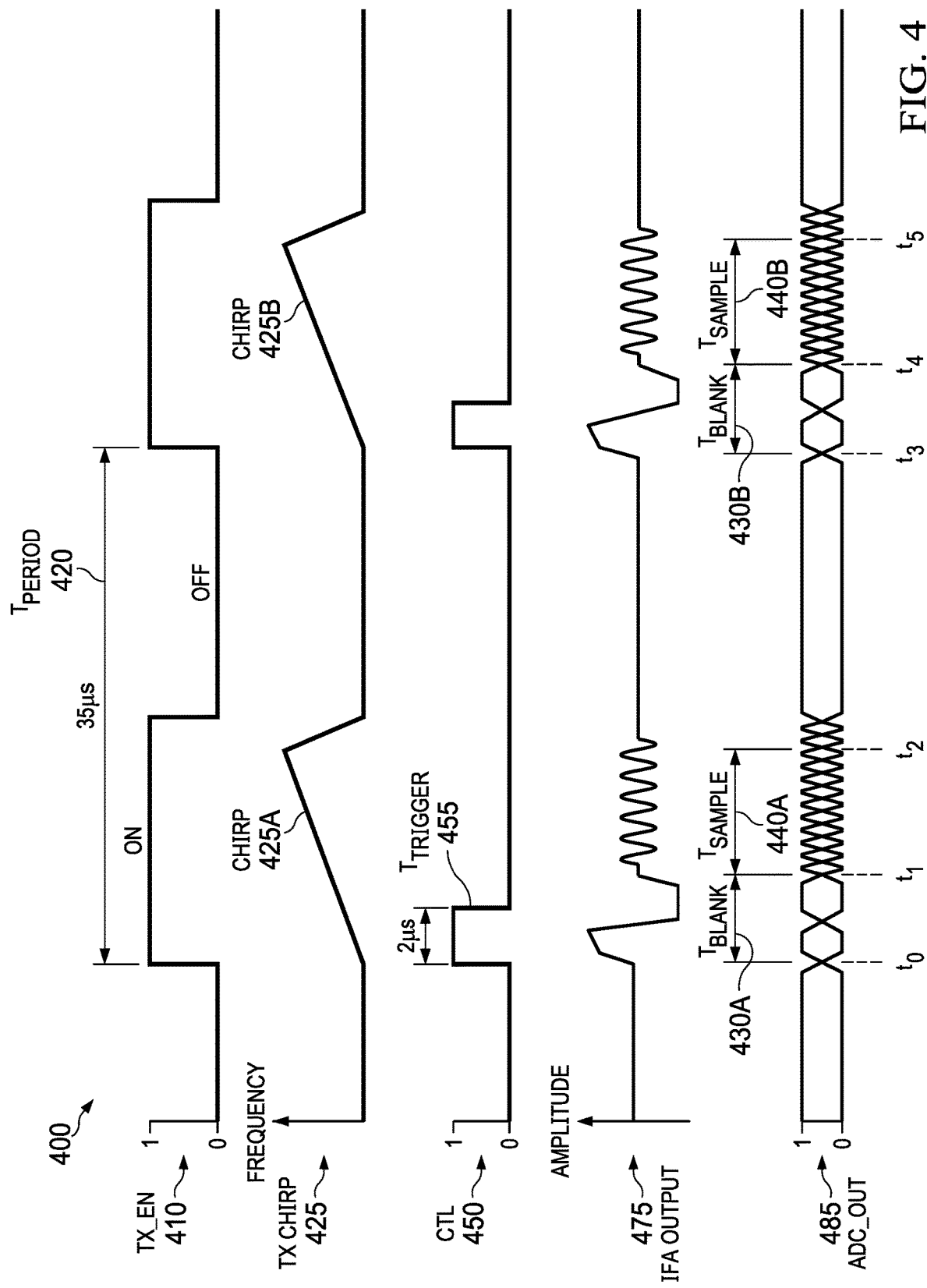
FIG. 4 shows waveforms of signals in an example radar system with a configurable high pass filter in the intermediate frequency amplifier.

FIG. 4 shows waveforms 400 of signals in an example radar system with a configurable high pass filter in the IFA. For ease of illustration, the signals shown herein are discussed with respect to the radar system 100 shown in FIG. 1. The enable signal TX_EN 410 is similar to the enable signal TX_EN 310 shown in FIG. 3, and has a period Tperiod 420 of approximately 35 µs in this example. The length of Tperiod 420 may be reduced because of the improved settling time of IFA output 475, as explained below. The TX chirp signal 425 is similar to the TX chirp signal 125 shown in FIG. 3, but the TX chirp signals 425A and 425B may begin at 76.1 GHz and increase to 77 GHz, corresponding to 900 MegaHerz (MHz) bandwidth. The control signal CTL 450 is a dynamic bandwidth selection signal used to increase the high pass filter cutoff for the configurable high pass filter included in the IFA for an initial period of time after turn-on. In the context of the frequency spectrum 200 of the output signal 165 shown in FIG. 2, the increased cutoff frequency causes the high pass filter in the IFA to filter out the blocker signal 210 at lower frequencies while maintaining the desired signal 220 at higher frequencies.

The IFA output 475 is the intermediate frequency signal generated by the IFA with a configurable high pass filter, and the ADC_OUT 485 is the output signal generated by the ADC 180 based on the IFA output 475. At time t0, the TX_EN 410 goes logic high, causing the PA 130, the LNA 150, the mixer 160, and the IFA with a configurable high pass filter to turn on. The control signal CTL 450 goes logic high for an initial period of time Ttrigger 455, adjusting the filter cutoff in the IFA and causing the IFA output 475 based on the chirp signal 425 to settle faster than the IFA output 175 shown in FIG. 3, at time t1. The initial period of time Ttrigger 455 is approximately 2 μs in this example.

As a result, less of the ADC_OUT 485 is wasted during the length of time Tblank 430A between t0 and t1, which is approximately 3 μs in this example. At time t2, the enable signal TX_EN 410 goes logic low, causing the PA 130, the LNA 150, the mixer 160, and the IFA with a configurable high pass filter to turn off. During the length of time Tsample 440A between t1 and t2, the ADC_OUT 485 is able to take meaningful digital samples of the settled IFA output 475. Because the IFA output 475 settles approximately 5 μs quicker than the IFA output 175, the period Tperiod 420 of the TX_EN signal 410 is approximately 5 μs shorter than the Tperiod 320 of the TX_EN signal 310 shown in FIG. 3, and the bandwidth of the chirps 425A and 425B is approximately 100 MHz shorter than the bandwidth of the chirps 125A and 125B shown in FIG. 3. The shorter period Tperiod 420 and bandwidth of chirps 425A and 425B enable faster chirp repetition and allow the radar system to detect faster objects.

The ADC_OUT 485 samples are used to determine the presence, distance, velocity, and direction of objects around the radar apparatus, as described herein with respect to FIG. 1. For example, two-dimensional FFTs may be performed on ADC samples from each of the chirps 425A, 425B, etc. to determine the presence, distance, and velocity of objects, and for multiple receivers to determine the direction of objects.

Figure 5:
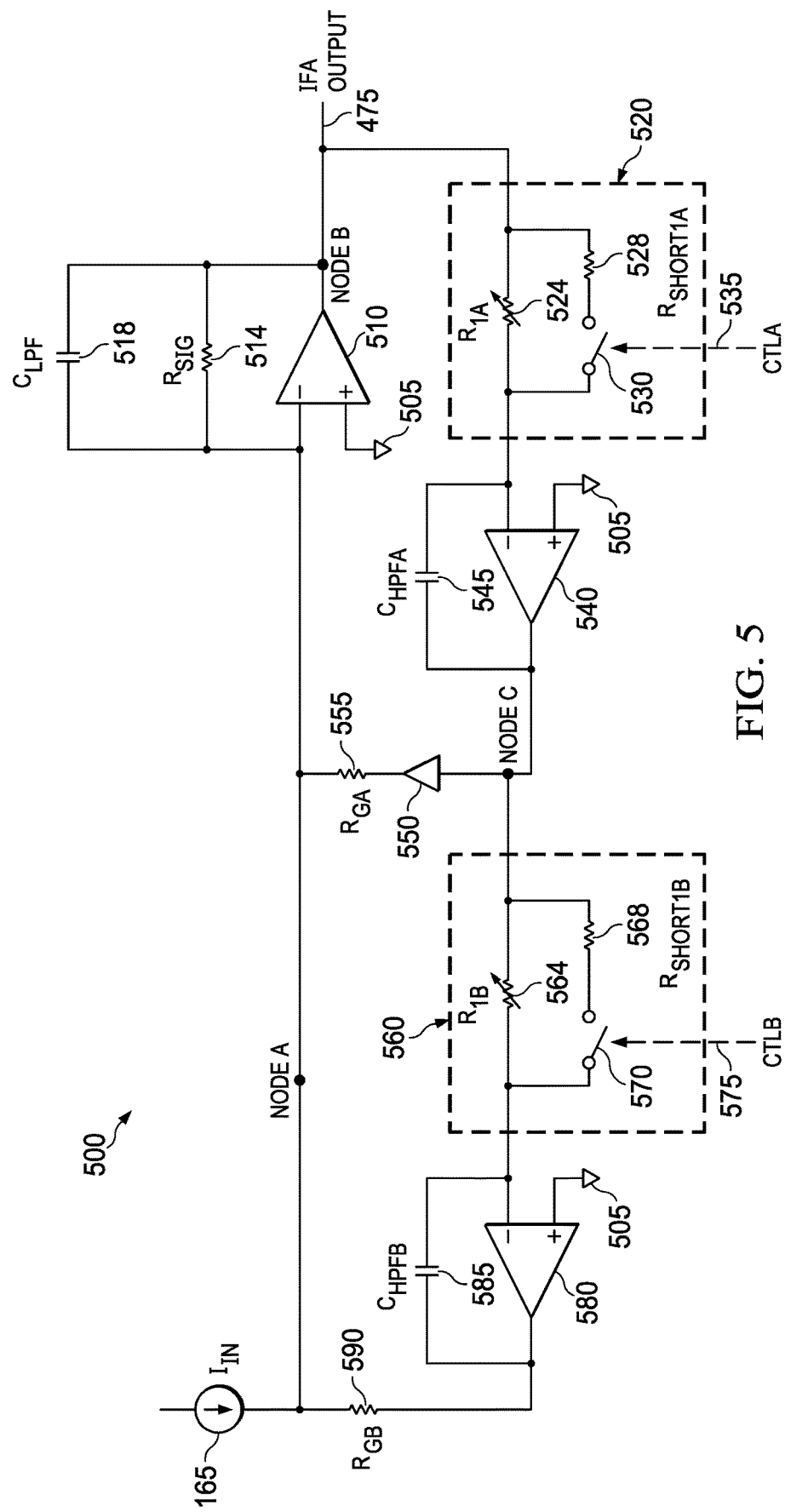
FIG. 5 shows an example intermediate frequency amplifier with a configurable high pass filter.

FIG. 5 shows an example intermediate frequency amplifier 500 with a configurable high pass filter. The IFA 500 may be used in place of IFA 170 in radar system 100 and is described herein with respect to the radar system 100 shown in FIG. 1. IFA 500 includes amplifiers 510, 540, and 580; resistors Rsig 514, R1a 524, Rshort1a 528, Rga 555, R1b 564, Rshort1b 568, and Rgb 590; capacitors Clpf 518, Chpfa 545, and Chpfb 585; buffer 550; and switches 530 and 570. In some examples, resistors R1a 524 and R1b 564 are variable resistors. An input node A receives the signal Iin 165 output from mixer 160 in the radar system 100, and an output node B provides the output signal IFA output 475, described herein with reference to FIG. 4, to the ADC 180.

The resistors Rgb 590 and Rga 555, as well as the negative input of the amplifier 510, are coupled to the input node A. The positive input of the amplifier 510 is coupled to ground 505. The output of amplifier 510 is coupled to the output node B. The resistor Rsig 514 and the capacitor Clpf 518 are coupled in parallel between the negative input of amplifier 510 and the output of amplifier 510. A first resistor stage 520 is coupled to the output node B, and includes the resistors R1a 524 and Rshort1a 528 and switch 530. In the first resistor stage 520, resistors R1a 524 and Rshort1a 528 are coupled together in parallel between the input of the first resistor stage 520, coupled to output node B, and the output of the first resistor stage 520, which is further coupled to the negative input of the amplifier 540.

The switch 530 is coupled between the resistor Rshort1a 528 and the output of the first resistor stage 520 and is configured to open and close based on the control signal CTLA 535. The control signal CTLA 535 is generated based on the dynamic bandwidth selection signal CTL 450 shown in FIG. 4, and causes the switch 530 to be closed while CTL 450 indicates the cutoff frequency of the high pass filter should be increased during the initial period of time Ttrigger 455 after turn-on, coupling the resistor Rshort1a 528 in parallel with resistor R1a 524 and reducing the overall resistance of the first resistor stage 520. The reduced resistance of the first resistor stage 520 enables faster small signal settling and a better slew rate for the IFA 500. While CTL 450 indicates the cutoff frequency of the high pass filter should be decreased after the initial period of time Ttrigger 455, the control signal CTLA 535 causes the switch 530 to be open, uncoupling the resistor Rshort1a 528 from resistor R1a 524, increasing the overall resistance of the first resistor stage 520. The resistance of R1a 524 can be varied to ensure the stability of IFA 500 across different gain settings.

The capacitor Chpfa 545 is coupled between the negative input of the amplifier 540 and the output of the amplifier 540, which is coupled to node C. The positive input of the amplifier 540 is coupled to ground 505. The input of the buffer 550 is coupled to the node C, and the output of the buffer 550 is coupled to the resistor Rga 555. The second resistor stage 560 has an input coupled to node C and includes the resistors R1b 564 and Rshort1b 568 and switch 570. Resistors R1b 564 and Rshort1b 568 are coupled together in parallel between the input of the second resistor stage 560, coupled to node C, and the output of the second resistor stage 560, which is further coupled to the negative input of the amplifier 580.

The switch 570 is coupled between the resistor Rshort1b 568 and the output of the second resistor stage 560 and is configured to open and close based on the control signal CTLB 575. The control signal CTLB 575 is generated based on the dynamic bandwidth selection signal CTL 450 shown in FIG. 4, and causes the switch 570 to be closed while CTL 450 indicates the cutoff frequency of the high pass filter should be increased during the initial period of time Ttrigger 455 after turn on, coupling the resistor Rshort1b 568 in parallel with resistor R1b 564 and reducing the overall resistance of the second resistor stage 560. The reduced resistance of the second resistor stage 560 enables faster small signal settling and a better slew rate for the IFA 500. While CTL 450 indicates the cutoff frequency of the high pass filter should be decreased after the initial period of time Ttrigger 455, the control signal CTLB 575 causes the switch 570 to be open, uncoupling the resistor Rshort1b 568 from resistor R1b 564, increasing the overall resistance of the second resistor stage 560. The resistance of R1b 564 can be varied to ensure the stability of IFA 500 across different gain settings. The capacitor Chpfb 585 is coupled between the negative input of the amplifier 580 and the output of the amplifier 580. The positive input of the amplifier 580 is coupled to ground 505.

The output of the amplifier 580 is coupled to the resistor Rgb 590. In other implementations, the resistance of the resistors Rga 455 and Rgb 490 can be varied to increase the high pass filter cutoff frequency as well as the variations in the overall resistance of the first resistor stage 520 and the second resistor stage 560, although variations in the resistances of Rga 555 and Rgb 590 do not affect the slew rate of the IFA 500. In other implementations, the capacitances of Chpfa 545 and Chpfb 585 can be varied to increase the high pass filter cutoff frequency and improve the slew rate of the IFA 500. However, varying the capacitances of Chpfa 545 and Chpfb 585 leads to additional resettling after the high bandwidth configuration is exited.

Figure 6:
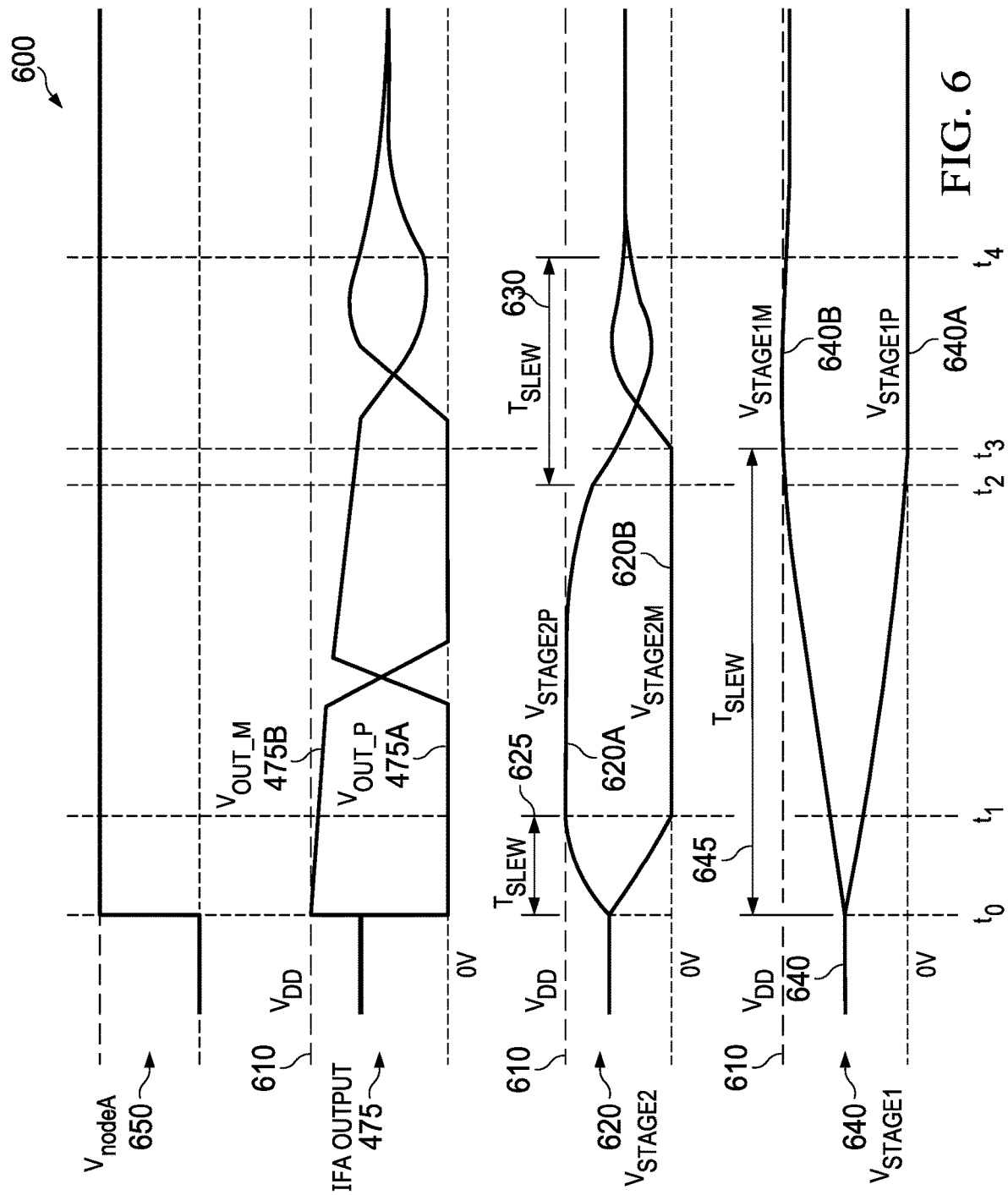
FIG. 6 shows waveforms of signals in the example intermediate frequency amplifier with a configurable high pass filter shown in FIG. 5.

FIG. 6 shows waveforms 600 of signals in the example IFA 500 shown in FIG. 5. A voltage on node A due to the current Iin 165 input to the IFA 500 from the mixer 160 is represented as VnodeA 650, and increases in a step function at time t0. The differential output voltage of IFA output 475 comprises a positive Vout_P 475A and a negative Vout_M 475B, the absolute value of which is shown in the waveforms 600. At time t0, Vout_P 475A and Vout_M 475B of the IFA output 475 begin oscillating between 0 volts (V) and the supply voltage Vdd 610 before settling at time t4.

The voltage V_stage2 620 represents the voltage on node C, at the output of the second order stage including the amplifier 540, the capacitor Chpfa 545, and the first resistor stage 520. The differential voltage V_stage2 620 comprises a positive V_stage2P 620A and a negative V_stage2M 620B, the absolute value of which is shown in the waveforms 600. Between time t0 and t1, the period Tslew 625, the voltage V_stage2P 620A increases to the supply voltage Vdd 610, and the voltage V_stage2M 620B decreases to 0V. Between time t2 and t4, the period Tslew 630, the voltage V_stage2P 620A and V_stage2M 620B oscillate before settling at time t4.

The voltage V_stage1 640 represents the voltage at the output of amplifier 580, the output of the first order stage including the amplifier 580, the capacitor Chpfb 585, and the second resistor stage 560. The differential voltage V_stage1 640 comprises a positive V_stage1P 640A and a negative V_stage1M 640B, the absolute value of which is shown in the waveforms 600. Between time t0 and t3, the period Tslew 645, the voltage V_stage1M 640B increases to the supply voltage Vdd 610, and the voltage V_stage1P 640A decreases to 0V. At time t3, the voltage V_stage1 640 settles. The time between t0 and t4 is the length of time Ttrigger 455 during which CTL 450 indicates the cutoff frequency of the high pass filter in IFA 500 should be increased and CTLA 535 and CTLB 575 cause the switches 530 and 570, respectively, to be closed, reducing the overall resistances of resistance stages 520 and 560. In some examples, the IFA output 475 settles in approximately 2 μs.

Figure 7:
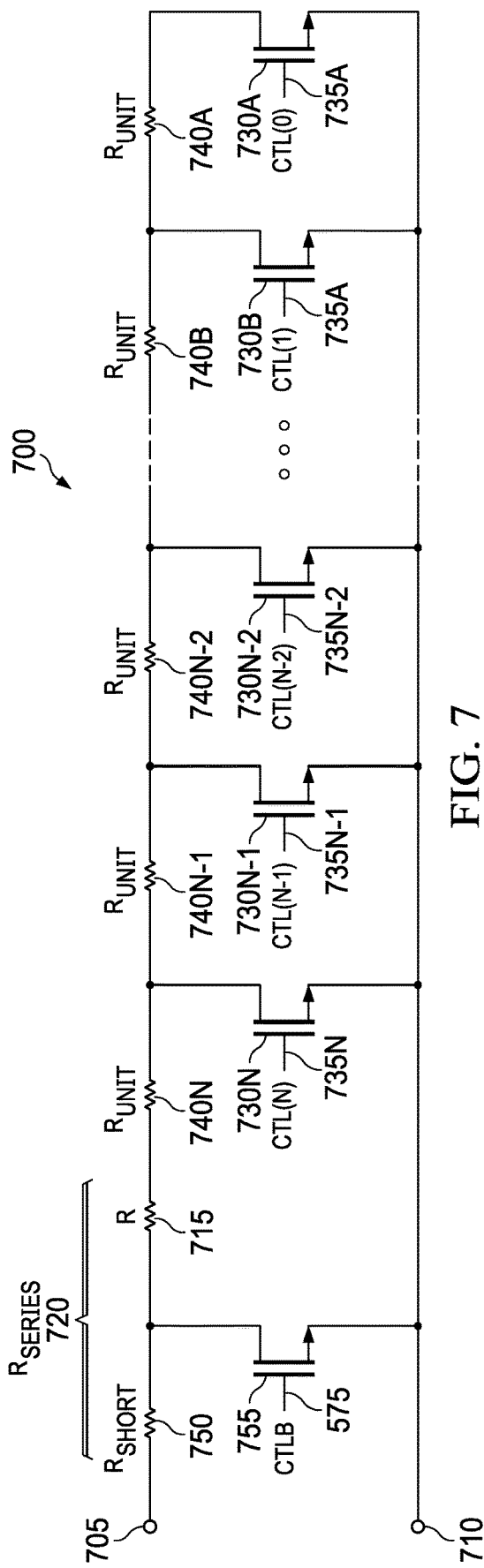
FIG. 7 shows an example series trimmed resistor for use in the first order high pass filter in the intermediate frequency amplifier shown in FIG. 5.

FIG. 7 shows an example series trimmed resistor 700 for use as variable resistor R1b 564 of the second resistor stage 560 in the first order high pass filter in the intermediate frequency amplifier 500 shown in FIG. 5. The series trimmed resistor 700 includes the resistor Rshort 750 and resistor R 715, as well as a number N of resistors Runit 740A-N; a transistor 755, and a number N of transistors 730A-N. The transistors 755 and 730A-N are metal oxide semiconductor field-effect transistors (MOSFETs) and are n-type MOSFETs (NMOS) in this example. In other examples, one or more of transistors 755 and 730A-N are p-type MOSFETs (PMOS) or bipolar junction transistors (BJTs). A BJT includes a base corresponding to the gate terminal of a MOSFET, and a collector and an emitter corresponding to the drain and source terminals of a MOSFET. The base of a BJT and the gate terminal of a MOSFET are also called control inputs. The collector and emitter of a BJT and the drain and source terminals of a MOSFET are also called current terminals.

The terminal 705 is coupled to node C in the IFA 500 and the terminal 710 is coupled to the negative input of the amplifier 580 in the IFA 500. The resistor Rshort 750 is coupled to the terminal 705 and to the drain terminal of transistor 755. The source terminal of transistor 755 is coupled to terminal 710, and the gate terminal of transistor 755 is configured to receive the control signal CTLB 575, which is generated based on the control signal CTL 450 as described in FIG. 4. The resistor R 715 is coupled to the resistor Rshort 750 and the drain terminal of transistor 755. The transistor 755 and the resistors Rshort750 and R 715 comprise the stage Rseries 720.

The resistor Runit 740N is coupled to the resistor R 715 and to the drain terminal of the transistor 730N. The gate terminal of transistor 730N is configured to receive the control signal CTL(N) 735N, and the source terminal of transistor 730N is coupled to the terminal 750. Similarly, the resistor Runit 740N-1 is coupled to the resistor Runit 740N and to the drain terminal of transistor 730N-1. The gate terminal of transistor 730N-1 is configured to receive the control signal CTL(N-1) 735N-1, and the source terminal of transistor 730N-1 is coupled to the terminal 750.

Each of resistors Runit 740N-2 through 740A and transistors 730N-2 through 730A are similarly configured in stages, such that the overall resistance of the series trimmed resistor 700 can be tailored to the desired value for the particular implementation. During the initial period Ttrigger 455, the control signal CTLB 575 causes the transistor 755 to act as a closed switch, decreasing the overall resistance of the series trimmed resistor 700 acting as R1b 564 and further reducing the effective resistance of the second resistor stage 560. The control signals CTL(N) 735N through CTL(0) 735A are chosen to set the desired resistance of R1b 564, such that the IFA 500 remains stable across different gain settings. For example, the digital ramp generator 110 shown in FIG. 1 can act as a controller and be further configured to adjust a gain setting of the IFA 500 to a desired gain for the particular implementation and enable or disable one or more control signals CTL 735A-N to increase or decrease the effective resistance of the series trimmed resistor 700 acting as resistor R1b 564 in the second resistor stage 560.

Figure 8:
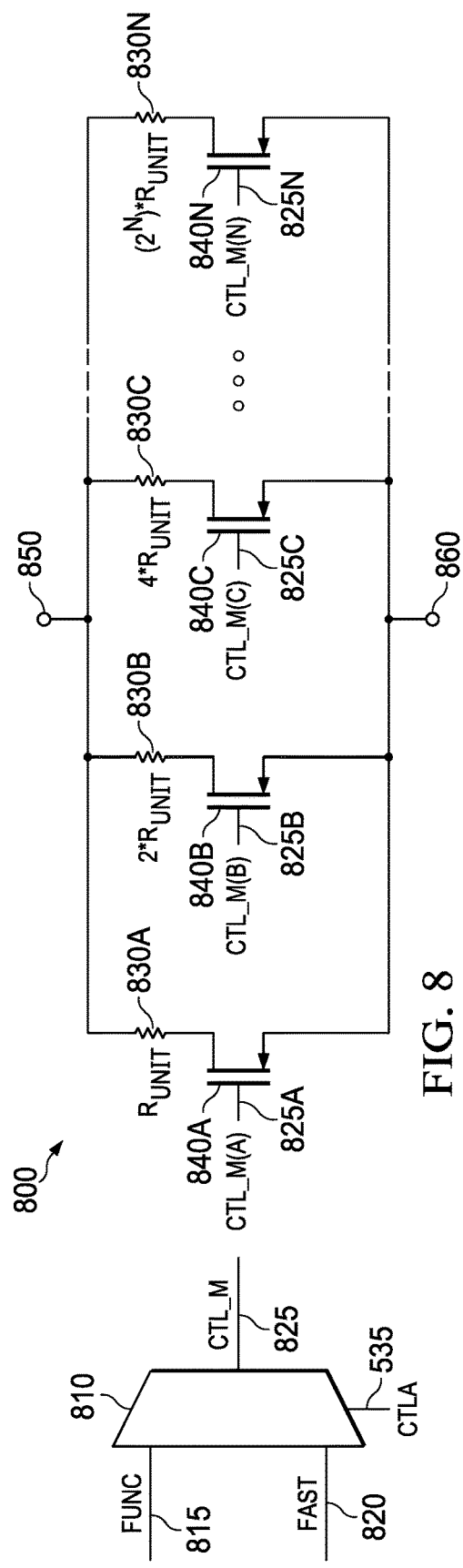
FIG. 8 shows an example parallel trimmed resistor for use in the second order high pass filter in the intermediate frequency amplifier shown in FIG. 5.

FIG. 8 shows an example parallel trimmed resistor 800 for use as resistor R1a 524 in resistor stage 520 of the second order high pass filter in the IFA 500 shown in FIG. 5. The parallel trimmed resistor 800 includes a multiplexor 810, a number N of resistors 830A-N, and transistors 840A-N. The transistors 840A-N are NMOS in this example. In other examples, one or more of transistors 840A-N are PMOS or BJTs. The multiplexor 810 is shown as a multiplexor in this example, but any appropriate selector logic circuit may be used.

The multiplexor 810 has a first input for a first functional trim signal FUNC 815 and a second input for a second fast trim signal FAST 820. The FUNC signal 815 and the FAST signal 820 act as control signals for the transistors 840A-N to couple more or fewer of the resistors 830A-N in parallel. The FUNC signal 815 is configured to set a value of the parallel trimmed resistor 800 during a normal mode of operation, and the FAST signal 820 is configured to set a value of the parallel trimmed resistor 800 during the initial period Ttrigger 455.

The multiplexor 810 is configured to output the control signal CTL_M 825 based on the control signal CTLA 535. For example during the initial period Ttrigger 455, the control signal CTLA 535 causes the multiplexor 810 to output the FAST signal 820 as the control signal CTL_M 825. The FAST signal 820 can reduce the overall resistance of parallel trimmed resistor 800 acting as R1a 524 and further reducing the effective resistance of the first resistor stage 520. After the initial period Ttrigger 455, the control signal CTLA 535 causes the multiplexor 810 to output the FUNC signal 815 as the control signal CTL_M 825. In some implementations, CTL_M 825 is an N-bit signal, with each of the N bits indicating the intended state of the corresponding transistor 830.

The source terminals of transistors 840A-N are coupled to terminal 860, which may be coupled to node B in the IFA 500 at the input of the first resistor stage 520. The drain terminals of transistors 840A-N are coupled to the resistors 830A-N, respectively, which are further coupled to terminal 850. Terminal 850 may be coupled to the negative input of the amplifier 540 at the output of the first resistor stage 520. The gate terminals of transistors 840A-N are configured to receive the control signal CTL_M 825, which causes the transistors 840A-N to turn on or off based on the state of the corresponding bit of CTL_M 825. In some implementations, the resistance of the resistor 830A is a value Runit, the resistance of the resistor 830B is 2*Runit, and so on, such that the resistance of the resistor 830N may be represented as:

(2N)*Runit

The FUNC signal 815 can be chosen to set the desired resistance of R1a 524, such that IFA 500 remains stable across different gain settings. For example, the digital ramp generator 110 shown in FIG. 1 can act as a controller and be further configured to adjust a gain setting of the IFA 500 to a desired gain for the particular implementation. The digital ramp generator 110 can then enable or disable particular bits of FUNC signal 815 such that one or more of transistors 840A-N turn on or turn off, coupling or uncoupling the corresponding resistors 830A-N from the parallel trimmed resistor 800 acting as resistor R1a 524 in the first resistor stage 520.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A method, comprising:
   generating a radar chirp after an analog component of a radar system is turned on;
   during a first portion of the radar chirp, controlling a high-pass filter in an intermediate frequency amplifier (IFA) of the radar system to operate at a first cutoff frequency, the controlling including:
   closing a first electrical path, via a first switch in response to a control signal, between an output of a first amplifier of the IFA and an input of a second amplifier of the IFA to couple a first resistive element in parallel with a second resistive element between the output of the first amplifier and the input of the second amplifier, and closing a second electrical path, via a second switch in response to the control signal, between an output of the second amplifier and an input of a third amplifier of the IFA to couple a third resistive element in parallel with a fourth resistive element between the output of the second amplifier and the input of the third amplifier;
   during a second portion of the radar chirp, controlling the high-pass filter in the IFA to operate at a second cutoff frequency that is lower than the first cutoff frequency, the controlling including opening the first and second electrical paths via the first and second switches respectively in response to the control signal; and sampling a signal at an output of the IFA during at least a sub-portion of the second portion of the radar chirp, the second portion following the first portion of the radar chirp, wherein the radar chirp is not sampled during the first portion.

2. The method of claim 1, wherein the first cutoff frequency is higher than the second cutoff frequency.

3. The method of claim 2, wherein the output of the first amplifier is the output of the IFA, and the output of the third amplifier is an input of the IFA.

4. The method of claim 1, further comprising:
generating a plurality of radar chirps; and
turning off the analog component between each radar chirp in the plurality of radar chirps.

5. The method of claim 1, further comprising:
determining at least one of a distance, velocity, and direction of an object around the radar system based samples obtained from the sampling of the signal during at least the sub-portion of the second portion of the radar chirp.

6. A device, comprising:
a digital ramp generator;
an oscillator coupled to the digital ramp generator and configured to generate a radar chirp signal based on an output from the digital ramp generator;
a first amplifier coupled to the oscillator and configured to output an amplified radar chirp signal;
a second amplifier configured to receive a reflected radar chirp signal;
a mixer configured to receive an output of the second amplifier and the radar chirp signal from the oscillator; and
an intermediate frequency amplifier (IFA) that includes an input coupled to an output of the mixer, an output, and a configurable high-pass filter, the configurable high-pass filter including a first stage and a second stage, wherein:
the first stage includes a third amplifier and a first pair of resistive elements selectively couplable in parallel between the output of the IFA and an input of the third amplifier;
the second stage includes a fourth amplifier and a second pair of resistive elements selectively couplable in parallel between an output of the third amplifier and an input of the fourth amplifier; and
an output of the fourth amplifier is coupled to the input of the IFA;
wherein at least one of the first and second stages includes a switch configured to close to couple at least one of the first and second pairs of resistive elements in parallel to set a cutoff frequency of the at least one of the first and second stages at a first cutoff frequency that is higher than a second cutoff frequency when the switch is open.

7. The device of claim 6, wherein the first and second stages of the high-pass filter are configured to operate at the first cutoff frequency during a first portion of the radar chirp signal and at the second cutoff frequency during a second portion of the radar signal.

8. The device of claim 7, wherein the first cutoff frequency is chosen based on a frequency of a blocker signal introduced by couplings between transmitter and receiver antennas, the first amplifier configured to output the amplified radar chirp signal to the transmitter antenna and the second amplifier configured to receive the reflected radar chirp signal from the receiver antenna.

9. The device of claim 7, wherein the first portion of the radar chirp signal is a length of time during which an output signal of the IFA settles, the device further comprising:
an analog-to-digital converter (ADC) coupled to the output of the IFA, the ADC configured to ignore the output signal of the IFA during the first portion and to sample the output signal of the IFA during at least a sub-portion of the second portion.

10. The device of claim 6, further comprising a transmitter antenna configured to receive the amplified radar chirp signal from the first amplifier, and a receiver antenna configured to receive the reflected radar chirp signal and provide the reflected radar chirp signal to the second amplifier.

11. An apparatus, comprising:
an intermediate frequency amplifier (IFA) including an input node and an output node, and further including:
a first amplifier having a first input coupled to the input node of the IFA, a second input coupled to a ground node, and an output coupled to the output node;
a resistive capacitive circuit coupled between the first input of the first amplifier and the output node;
a first high-pass filter stage having an input coupled to the output node, and an output coupled to the input node, the first high-pass filter stage including a second amplifier and a first configurable impedance component coupled to an input of the second amplifier, the first configurable impedance component including a first resistor coupled between the output node and the input of the second amplifier, a second resistor coupled to the output node, a switch coupled between the second resistor and the input of the second amplifier, and a capacitor coupled between the input of the second amplifier and an output of the second amplifier, wherein the switch is configured to open in response to receiving a control signal to change a cutoff frequency of the first high-pass filter stage from a first cutoff frequency to a second cutoff frequency, wherein the second cutoff frequency is lower than the first cutoff frequency; and
a second high-pass filter stage having an input coupled to the output of the first high-pass filter stage and to the input node, and an output coupled to the input node, the second high-pass filter stage including a third amplifier and a second configurable impedance component coupled to an input of the third amplifier.

12. The apparatus of claim 11, wherein:
the input of the first amplifier is a negative input;
the input of the second amplifier is a negative input.

13. The apparatus of claim 11, wherein the input node is configured to receive a mixer output signal comprising a reflected chirp signal and a transmitted chirp signal.

14. The apparatus of claim 13, wherein the output node is configured to provide an intermediate frequency signal based on the mixer output signal.

15. The apparatus of claim 11, further comprising:
a digital ramp generator having an output;
an oscillator having an input coupled to the output of the digital ramp generator, and an output, wherein the oscillator is configured to generate a radar chirp signal based on an output signal from the digital ramp generator;
a power amplifier having an input coupled to the oscillator output, and an output, wherein the power amplifier is configured to output an amplified radar chirp signal;
a low-noise amplifier having an input configured to receive a reflected radar chirp signal, and an output; and a mixer having a first input coupled to the output of the low-noise amplifier, a second input coupled to the oscillator output, and an output coupled to the input node.

16. The apparatus of claim 15, wherein the first and second high-pass filter stages have the first cutoff frequency during a first portion of the radar chirp signal and have the second cutoff frequency during a second portion of the radar chirp signal.

17. The apparatus of claim 16, further comprising:
a transmitter antenna coupled to the power amplifier output; and
a receiver antenna coupled to the low-noise amplifier input.

18. The apparatus of claim 17, wherein the first cutoff frequency is chosen based on a frequency of a blocker signal introduced by couplings between the transmitter and receiver antennas.

19. An apparatus, comprising:
an intermediate frequency amplifier (IFA) including an input node and an output node, and further including:
a first amplifier having a first input coupled to the input node of the IFA, a second input coupled to a ground node, and an output coupled to the output node;
a resistive capacitive circuit coupled between the first input of the first amplifier and the output node;
a first high-pass filter stage having an input coupled to the output node, and an output coupled to the input node, the first high-pass filter stage including a second amplifier and a first configurable impedance component coupled to an input of the second amplifier; and
a second high-pass filter stage having an input coupled to the output of the first high-pass filter stage and to the input node, and an output coupled to the input node, the second high-pass filter stage including a third amplifier and a second configurable impedance component coupled to an input of the third amplifier, the second configurable impedance component including:
a first resistor having a first terminal forming the input of the second configurable impedance component and a second terminal coupled to an input of the third amplifier;
a second resistor coupled to the input of the second configurable impedance component; and
a switch coupled between the second resistor and the input of the third amplifier, wherein the switch is configured to close in response to receiving a control signal to set a cutoff frequency of the second high-pass filter stage to a first cutoff frequency that is higher than a second cutoff frequency when the switch is open; and
a capacitor coupled between the input of the third amplifier and an output of the third amplifier.

* * * * *